United States Patent
Jagersberger

Patent Number: 5,477,007
Date of Patent: Dec. 19, 1995

[54] TWISTED CONDUCTOR

[75] Inventor: Kurt Jagersberger, Pernitz, Austria

[73] Assignee: ASTA Elektrodraht GmbH, Wiener Neustadt, Austria

[21] Appl. No.: 129,033

[22] PCT Filed: Apr. 2, 1992

[86] PCT No.: PCT/AT92/00045

§ 371 Date: Oct. 26, 1993

§ 102(e) Date: Oct. 26, 1993

[87] PCT Pub. No.: WO92/17891

PCT Pub. Date: Oct. 15, 1992

[30] Foreign Application Priority Data

Apr. 5, 1991 [AT] Austria ................... 726/91

[51] Int. Cl.[6] .......................................... H01B 7/34
[52] U.S. Cl. ................ 174/15.6; 174/33; 336/60; 336/206
[58] Field of Search ............... 174/15.6, 27, 32, 174/33; 336/60, 206

[56] References Cited

U.S. PATENT DOCUMENTS

| | | | |
|---|---|---|---|
| 3,657,466 | 4/1972 | Woodcock et al. | 174/27 |
| 4,173,747 | 11/1979 | Grimes et al. | 336/60 |
| 4,489,298 | 12/1984 | Hall | 336/206 |

FOREIGN PATENT DOCUMENTS

| | | | |
|---|---|---|---|
| 572465 | 11/1958 | Belgium | 336/60 |
| 0167896 | 1/1985 | European Pat. Off. | |
| 0133220 | 2/1985 | European Pat. Off. | |
| 407308 | 1/1991 | European Pat. Off. | |
| 2308549 | 11/1976 | France | |
| 1016819 | 10/1957 | Germany | |
| 1807556 | 6/1970 | Germany | |
| 2045289 | 3/1972 | Germany | |
| 52-115317 | 9/1977 | Japan | |

*Primary Examiner*—Morris H. Nimmo
*Attorney, Agent, or Firm*—Sandler, Greenblum & Bernstein

[57] ABSTRACT

The present invention is directed to a twisted conductor in which better use is made of the material and at the same time the structural dimensions are reduced. The partial conductor has a sharp bend so that the two partial conductor stacks are mutually parallel and leave a space between them. An intermediate piece is fitted in this space in the region of the bend. Thus there is a cooling channel in the twisted conductor for the radial flow of coolant. To ensure that the partial conductor bunch forms a coherent twisted conductor there is a casing in the region of the bend. This casing is a glass-cloth binding pre-impregnated with epoxy resin in the B state. Because of the improved filling factor, the structural height of the transformer can be reduced, resulting in the elimination of the paper insulation itself and the longitudinal intermediate pressboard layer. Moreover, the intermediate pieces can be thinner since there is no longer any need to allow for the expansion of the paper in the spacers.

6 Claims, 1 Drawing Sheet

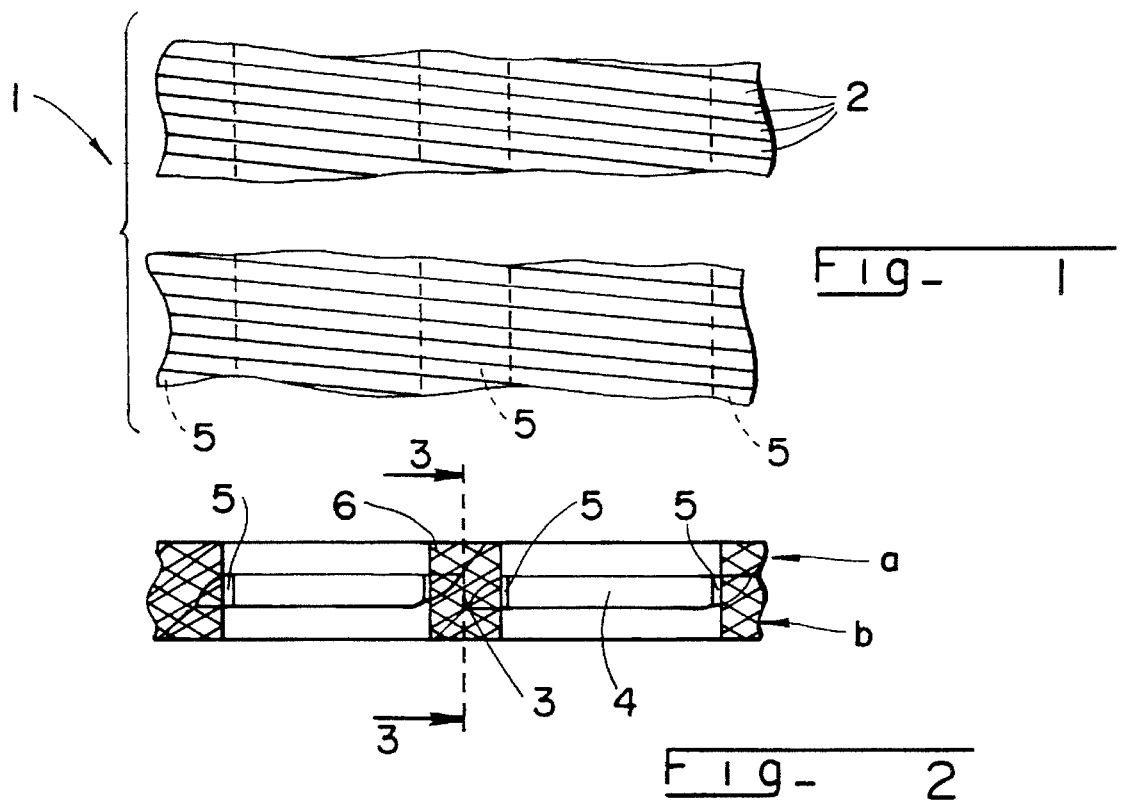
Fig. 1
Fig. 2
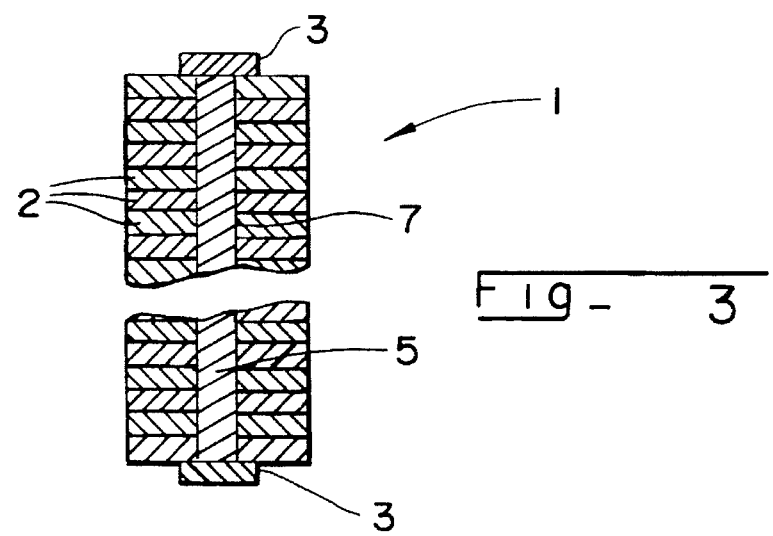
Fig. 3

5,477,007

TWISTED CONDUCTOR

BACKGROUND OF THE INVENTION

1. Field of the Invention

This invention pertains to a twisted conductor for the windings of electrical machines and devices, particularly transformers, which are assembled of single enamel-insulated flat partial conductors having a rectangular cross-section, in which the partial conductors on both flat sides of the cross-section extend obliquely in the opposite sense and, on the small sides of the cross-section, cross over, from one side to the other, via a sharp bend and wherein the stacked partial conductors, in cross-section, are arranged, next to each other with spacings.

2. Discussion of Background and Relevant Information

The use of twisted winding rods, so-called Roebel rods, in the production of electrical machines is known. Thus, these types of winding rods are used for the suppression or reduction of eddy current losses in the groove rods of particularly large electrical machines. In order to provide room for the axial through-put of a cooling medium, on the inside of the winding rod, that is, between the flat sides formed via the single conductors in the intermediate space between the two partial conductor stacks, specific cooling channels were formed through the corresponding arrangements of the partial conductors or specific formed conduits were arranged. For the strengthening of the winding rod it was provided with a glass-mica covering. This covering served, at the same time, as a cooling channel seal.

The utilization of twisted conductors as winding material in the manufacture of transformers has also been known for a long time. Moreover, twisted conductors are usually comprised of an uneven number of enamelled flat wires of copper or aluminum, that are stranded or roebelied according to a special system. During this process one conductor travels upwardly and one conductor travel downwardly regularly from one conductor stack to the other. The whole conductor bundle, depending upon requirements, is provided with a more or less thick paper insulation, wherein these paper wrappings on one side serve as additional insulation, depending upon the electrical strength, and on the other side are indispensable for the coherence of the conductor bundle. For additional stability of the bundle, a press board intermediate layer is longitudinally arranged between the conductor stacks.

During the winding of such twisted conductors, spacer platelets are inserted between the windings in order to form an oil channel for the improved cooling of the windings. These spacer platelets have a thickness of about 5 mm. Purely theoretically, this thickness could be reduced. Due to the paper insulation surrounding the twisted conductors however, this thickness must be chosen. This paper insulation however has the property that it, so to speak, loosens itself from the flat side of the twisted conductor and bulges into the cooling channel, thus reducing the cooling channel cross-section. In addition, in the region before and after the spacer platelets, cooling media jams are caused by the formation of pockets, thus resulting in poor cooling medium circulation.

From EP 167 896, a flanged spool winding for transformers is known. During this winding, spacer platelets are used for forming radial cooling channels. These spacer platelets are arranged between the windings and are manually inserted during the winding assembly. As a result thereof the previously recited disadvantages are accrued therefrom.

In addition, from EP 133 220, an electrical conductor with partial conductor transpositions, according to Roebel, is known, particularly wherein the conductor is stranded from six partial conductors, or elements. These elements are so arranged around a square pipe so that the square pipe serves as the cooling channel. In order to achieve increased coolant circulation the previously-discussed spacer platelets, with all their noted disadvantages, again had to be utilized.

SUMMARY OF THE INVENTION

The object of this invention is to produce a twisted conductor of the type described above, which takes into account the requirements of machine and apparatus builders and which permits a better utilization of materials while simultaneously reducing the construction size.

The twisted conductor of this invention is characterized in that the spacing in the region of the sharp bend, intermediate pieces are arranged so that a radial cooling channel for the through-flow of cooling medium is provided.

With this invention it is possible for the first time to achieve an advantageous winding filling factor, whereby the construction height of the electrical machine or the electrical apparatus, preferably of a transformer, is reduced. In addition, according to the twisted conductor of this invention, the winding time is also reduced, since the time-consuming insertion of the spacer platelets, for the formation of the oil channels, between the windings during the winding process is eliminated.

A not unessential advantage in transformer construction is also provided by the twisted conductor of this invention. Via the spacing between the stacked partial conductors, the sharp bends are relieved. In this way, since the pressure upon the sharp bends does not occur due to the restricted space, the insulation coating of the partial conductors is not stressed so that it greatly reduces the danger of failure of the partial conductors.

An additional feature of this invention is the use for a casing of a large mesh, partially cross-linked glass-cloth binding, pre-impregnated with epoxy resin. In order to warrant the coherence of the conductor bundles and to increase the mechanical stability of the twisted conductor after heat treatment, an appropriate meshed netting is utilized which on one side has the required resistance to expansion and on the other side permits the transformer oil to pass without hindrance past the conductor bundles.

In accordance with a particular embodiment of this invention the casing is utilized only in the region of the sharp bends. As already previously noted, the usual twisted conductors, even when used for low voltage windings, for reason of the bundle coherence, are provided with a paper insulation. This insulation, upon the final pressing of the winding, and dependent upon the bundle geometry via bulging of the paper between the spacer platelets, reduces the winding opening or the oil channel between the windings. A criteria of this invention is to produce, by machine, a twisted conductor having a cooling channel between the partial conductor stacks in which the cross-wise extending single conductors at the upper and lower ends of the bundle, achieved via the spacer platelets, do not close the radial cooling channel.

Generally, it should also be that a casing around the twisted conductor, according to this invention, has the characteristic that, upon hardening, no bulging can occur.

In accordance with a very particular embodiment of this invention, the intermediate pieces are coated with epoxy resin or have a partially cross-linked pre-impregnated glass fiber fleece. The advantage of such an arrangement is obvious. The casing will no longer be apparent since the bundle cohesion results upon the hardening of the epoxy resin via the sticking together of the intermediate pieces with the partial conductor stacks.

BRIEF DESCRIPTION OF THE DRAWINGS

The invention will be explained in more detail in view of the embodiments shown in the drawing, wherein:

FIG. 1 shows a top view of the flat side of a twisted conductor;

FIG. 2 is a top view of the narrow side; and

FIG. 3 a cross-section of the twisted conductor, taken in the direction of arrows 3—3 in FIG. 2.

DETAILED DESCRIPTION OF A PREFERRED EMBODIMENT

According to FIG. 1 the flat side of a twisted conductor 1 according to the invention is illustrated, in which the partial conductors are stacked. At the same time it is known that the twisted conductor is comprised of up to about 80 partial conductors 2. During the twisting of the partial conductors into a twisted conductor, which is performed by machine, out of two partial conductor stacks, each time a partial conductor 2 of the upper stack a or the lower stack b shifts over to the other partial conductor of the other stack, the partial conductor is preferably displaced one half unit interval. This deformation for the cross-over of partial conductor 2 from one partial conductor stack to the other partial conductor stack (FIG. 2) takes the form of sharp bend 3. Beyond sharp bend 3, partial conductors 2 extend obliquely.

As shown in FIG. 2, partial conductors 2 have a sharp bend 3, so that both partial conductor stacks a,b lie, with a space 4, parallel with each other. Within this space 4, in the region of bend 3, intermediate pieces 5 are arranged. Thus, for twisted conductor 1 a cooling channel is formed at space 4 for the radial flow of coolant.

In order to ensure that the partial conductor bunch or bundle forms a coherent twisted conductor 1, there is a casing 6 in the region of bend 3. This casing 6 is a large mesh, partially cross-linked glass-cloth binding that is pre-impregnated with epoxy resin.

In accordance with the cross-section of FIG. 3, the twisted conductor 1, in the space between the partial conductor stacks a,b formed by partial conductors 2, includes an intermediate piece 5. The casing 6 is not shown in FIG. 3, for simplicity. The upper surface of intermediate piece 5 is provided with a glass fiber fleece 7, wherein glass fiber fleece 7 is pre-impregnated with a partially cross-linked epoxy resin.

Via the use of this twisted conductor 1, in accordance with FIG. 3, for the production of windings in the manufacture of transformers, immense advantages are achieved.

During the production of transformer windings with conventional twisted conductors, which utilize continuous paper insulation and a longitudinally-extending pressboard intermediate layer, between the partial conductors, the manual insertion of spacer platelets for the creation of the oil channels is required. In addition, during the thickness measurement of the spacer platelets, the already mentioned expansion of the insulation paper has to be considered.

If the twisted conductor in accordance with FIGS. 1 to 3 is used, then the structural height of the transformer can be reduced due to the improved filling factor. The improved filling factor results, on the one side, from the elimination of the insulation as well the elimination of the longitudinally extending pressboard intermediate layer. In addition thereto, the thickness of the intermediate pieces 5 can also be less than the thickness of the spacer platelets since there is no longer any need to allow for the expansion of the paper in the spacer platelets.

For the builder of transformers, the twisted conductor 1 according to the present invention has three incalculable advantages. On one side, via its use the total height of the transformer, at the same efficiency, is reduced, and on the other side a working step, namely the manual insertion of the spacer platelets, is eliminated. Due to this construction, the cooling efficiency is substantially improved, since the cooling medium flows directly past the enamel-insulated conductors. This generally means also the reduction of the multiple layer winding to a one layer winding.

I claim:

1. A twisted conductor for the windings of electrical machines and devices, comprising:

a plurality of single, stacked, assembled, enamel-insulated, flat partial conductors, forming a plurality of partial conductor stacks, each conductor stack having a rectangular cross-section with opposed flat sides and opposite small sides, in which the single conductors on the flat sides of the cross-section extend obliquely in an opposite sense and on the small sides of the cross-section cross over from one side to the other via a sharp bend;

the stacked partial conductors, in cross-section, being arranged next to each other, with each adjacent stack of said conductors having a spacing therebetween;

an intermediate piece being arranged in each spacing, in the region of the sharp bend; and the intermediate pieces being arranged, so as to provide a cooling channel for the radial flow of coolant therethrough.

2. A twisted conductor according to claim 1, further including a casing comprised of a large-mesh, partially cross-linked glass-cloth binding that is pre-impregnated with epoxy resin.

3. A twisted conductor according to claim 2, wherein the casing is provided only in the region of the sharp bend.

4. A twisted conductor according to claim 2, wherein the casing covers the entire twisted conductor.

5. A twisted conductor according to claim 1, wherein the intermediate pieces are comprised of a partially cross-linked pre-impregnated glass fiber fleece, coated with epoxy resin.

6. A twisted conductor according to claim 1, wherein the electrical machines and devices comprise electrical transformers.

* * * * *